United States Patent
Gong et al.

(10) Patent No.: US 11,403,227 B2
(45) Date of Patent: Aug. 2, 2022

(54) DATA STORAGE METHOD AND APPARATUS, AND SERVER

(71) Applicant: HUAWEI TECHNOLOGIES CO., LTD., Guangdong (CN)

(72) Inventors: Chenji Gong, Hangzhou (CN); Chao Zhou, Hangzhou (CN); Junjie Chen, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/199,492

(22) Filed: Mar. 12, 2021

(65) Prior Publication Data
US 2021/0200681 A1    Jul. 1, 2021

Related U.S. Application Data

(63) Continuation of application No. PCT/CN2019/094164, filed on Jul. 1, 2019.

(30) Foreign Application Priority Data

Sep. 13, 2018 (CN) .......................... 201811068815.8

(51) Int. Cl.
G06F 12/0873 (2016.01)
G06F 3/06 (2006.01)

(52) U.S. Cl.
CPC ........ *G06F 12/0873* (2013.01); *G06F 3/0604* (2013.01); *G06F 3/067* (2013.01); *G06F 3/0659* (2013.01)

(58) Field of Classification Search
None
See application file for complete search history.

(56) References Cited

U.S. PATENT DOCUMENTS 8,357,048 B2   1/2013   Grube et al.
9,529,542 B2   12/2016  Friedman et al.
(Continued)

FOREIGN PATENT DOCUMENTS

CN   103917963 A   7/2014
CN   104267912 A   1/2015
(Continued)

OTHER PUBLICATIONS

Architect Technology Alliance,"[Essence] RDMA technical principle analysis, mainstream implementation comparison and analysis", Sohu, Apr. 22, 2018,with an English machine translation, total 35 pages.
(Continued)

*Primary Examiner* — Brian R Peugh

(57) ABSTRACT

This disclosure relates to a data storage method and apparatus, and a server. The method includes receiving, by a first server, a write instruction sent by a second server, storing target data in a cache of a controller, detecting a read instruction for the target data, and storing the target data in a storage medium of a non-volatile memory based on the read instruction. In other words, when the second server needs to write the target data to the first server, the target data is not only written to the cache of the first server, but also written to the storage medium of the first server. This can ensure that the data in the cache is written to the storage medium promptly.

18 Claims, 5 Drawing Sheets

(56) References Cited

U.S. PATENT DOCUMENTS

| | | | |
|---|---|---|---|
| 9,720,603 B1 | 8/2017 | Salazar et al. | |
| 9,973,424 B1* | 5/2018 | Livesey | H04L 45/44 |
| 10,437,595 B1* | 10/2019 | Kanapathipillai | G06F 9/3838 |
| 10,901,710 B2* | 1/2021 | Ramani | G06F 9/3834 |
| 2004/0044878 A1* | 3/2004 | Evans | G06F 9/3869 |
| | | | 712/E9.05 |
| 2007/0067497 A1* | 3/2007 | Craft | H04L 69/32 |
| | | | 709/250 |
| 2015/0261674 A1 | 9/2015 | Wei et al. | |
| 2015/0312337 A1 | 10/2015 | Keremane et al. | |
| 2017/0177541 A1 | 6/2017 | Berman et al. | |

FOREIGN PATENT DOCUMENTS

| | | |
|---|---|---|
| CN | 105094691 A | 11/2015 |
| CN | 105786726 A | 7/2016 |
| CN | 107025065 A | 8/2017 |
| CN | 107092598 A | 8/2017 |
| CN | 107888687 A | 4/2018 |
| CN | 108347454 A | 7/2018 |
| CN | 108347455 A | 7/2018 |
| CN | 108475235 A | 8/2018 |
| CN | 108509150 A | 9/2018 |
| CN | 108509298 A | 9/2018 |

OTHER PUBLICATIONS

Feng Dan et al.,"Information storage technology patent data analysis",Intellectual Property Publishing House,Jan. 29, 2016,with an English Brief introduction, total 17 pages.

Liang Xinyuan et al.,"Principles and Applications of Network Storage",China Science and Technology Press, 2007.8, with an English Brief introduction, total 22 pages.

Office Action for Chinese Application No. 201811068815.8, dated Sep. 22, 2020, 9 pages.

Office Action for Chinese Application No. 201811068815.8, dated Aug. 23, 2021, 11 pages.

European Patent Office extended European Search Report for Application No. 19860935.6 dated Oct. 1, 2021, 7 pages.

PCT Communication for PCT/CN2019/094164 dated Sep. 19, 2019, 10 pages.

* cited by examiner

DATA STORAGE METHOD AND APPARATUS, AND SERVER

CROSS-REFERENCE TO RELATED APPLICATIONS

This is a continuation of International Patent Application No. PCT/CN2019/094164, filed on Jul. 1, 2019, which claims priority to Chinese Patent Application No. 201811068815.8, filed on Sep. 13, 2018. The disclosures of the aforementioned applications are hereby incorporated by reference in their entireties.

TECHNICAL FIELD

This disclosure relates to the field of storage technologies, and in particular, to a data storage method and apparatus, and a server.

BACKGROUND

A persistent memory over fabric (PMoF) service is to transfer, to another server, data that originally needs to be processed in a memory of a service server. This can resolve a problem that a capacity of the memory of the service server is limited. In addition, because a non-volatile memory has advantages of both a high read and write speed and low costs of non-volatile storage, a server deployed with the non-volatile memory may be used to provide the PMoF service for the service server. When the server deployed with the non-volatile memory is used to provide the PMoF service for the service server, a current focus is how to securely and effectively store data in the server deployed with the non-volatile memory.

SUMMARY

This disclosure provides a data storage method and apparatus, and a server, to resolve a problem that data is likely lost after the data is stored in a server deployed with a non-volatile memory, to improve security and effectiveness of data storage. Certain technical solutions are as follows.

According to a first aspect, a data storage method is provided, and the method includes: receiving, by a first server, a write instruction sent by a second server, where the first server includes a non-volatile memory, the non-volatile memory includes a controller and a storage medium, the first server communicates with the second server through a first network, and the write instruction includes target data; storing, by the first server, the target data in a cache of the controller; detecting, by the first server, a read instruction for target data, where the read instruction is used to instruct the first server to store the target data in the storage medium of the non-volatile memory; and storing, by the first server, the target data in the storage medium of the non-volatile memory according to the read instruction.

As a non-limiting example embodiment, after the first server stores the target data in the cache of the controller, the first server detects the read instruction for the target data, and stores the target data in the storage medium of the non-volatile memory based on the read instruction. In other words, when the second server needs to write the target data to the first server, the target data is not only written to the cache of the first server, but also written to the storage medium of the first server. This can ensure that the data in the cache is written to the storage medium promptly. Therefore, a case in which the second server becomes abnormal because the first server is faulty is avoided, and security and effectiveness of a process of storing the data to the first server are improved. In addition, according to the data storage method provided in this disclosure, because the first server provides a data storage service for the second server, only network resources and computing resources may be deployed in the second server, so that performance of the second server is improved.

Optionally, the first server further includes a first network interface card, and the detecting, by the first server, a read instruction for target data includes: when the first network interface card determines that all the target data is written to the cache, generating, by the first network interface card, the read instruction for the target data; and detecting, by the controller, the read instruction.

In a possible implementation, when the first network interface card in the first server determines that all the target data is written to the cache, the first network interface card actively triggers the read instruction for the target data, to instruct to flush the target data to the storage medium. In this way, the second server does not need to trigger the read instruction, and overhead of the second server is reduced.

Optionally, after the storing, by the first server, the target data in the storage medium of the non-volatile memory according to the read instruction, the method further includes: sending, by the first server, a first acknowledgment message for the write instruction to the second server.

For the foregoing possible implementation, because the first server immediately flushes the target data to the storage medium after storing the target data in the cache, the first server needs to send the first acknowledgment message for the write instruction to the second server after flushing the target data to the storage medium. In this way, the second server may determine, based on the first acknowledgment message, that the target data has been flushed to the storage medium, so that the second server learns a storage status of the target data promptly.

Optionally, the detecting, by the first server, a read instruction for target data includes: when the first server determines that all the target data is written to the cache, sending, by the first server, a second acknowledgment message for the write instruction to the second server, to enable the second server to send the read instruction for the target data to the first server when receiving the second acknowledgment message; and receiving, by the first server, the read instruction for the target data, to enable the first server to detect the read instruction.

In another possible implementation, when the first server determines that all the target data is written to the cache, the second server actively triggers the read instruction for the target data, to instruct the first server to flush the target data to the storage medium. In this way, the target data can be flushed to the storage medium promptly without a need to modify a program in the first server, so that the need to modify the program in the first server is avoided.

Optionally, the method further includes: returning, by the first server, the target data to the second server.

For the foregoing possible implementations, because the read instruction is triggered by the second server, the first server further needs to return the target data to the second server after flushing the target data to the storage medium, to respond to the read instruction sent by the second server promptly.

Optionally, before the detecting, by the first server, a read instruction for target data, the method further includes: setting, by the first server, a storage identifier of the target data in the cache to a first identifier, where the first identifier is used to indicate that the target data has not been written to the storage medium; and after the storing, by the first server, the target data in the storage medium of the non-volatile memory according to the read instruction, the method further includes: updating, by the first server, the storage identifier of the target data in the cache to a second identifier, where the second identifier is used to indicate that the target data has been written to the storage medium.

As a non-limiting example, the read instruction for the target data is used to trigger the first server to flush the target data to the storage medium. To prevent the first server from flushing corresponding data to the storage medium each time the first server receives a read instruction, the storage identifier is set for the data in the cache, to indicate whether the corresponding data is flushed to the storage medium. This can reduce unnecessary overhead generated by the controller.

Optionally, the read instruction for the target data includes a storage address of the target data in the cache; and the storing, by the first server, the target data in the storage medium of the non-volatile memory according to the read instruction includes: obtaining, by the first server, the target data based on the storage address of the target data in the cache, and storing the obtained target data in the storage medium of the non-volatile memory. When writing the target data to the cache, the first server has learned the storage address of the target data. Therefore, when reading the target data, the first server may directly obtain the target data based on the storage address. This avoids that the first server needs to obtain the storage address of the target data again, thereby reducing overhead of the controller.

Optionally, the first network includes a remote direct memory access (RDMA) network, and the non-volatile memory includes a storage class memory (SCM).

In a possible implementation, the first network may be the RDMA network. Because the RDMA network is a high-speed network, when processing data, a processor of the second server may directly store the data in the first server. This can reduce overhead of the processor of the second server, and improve the overall performance of the second server.

According to a second aspect, a data storage apparatus is provided, and the data storage apparatus has a function of implementing behavior of the data write method in the first aspect. The data storage apparatus includes at least one module, and the at least one module may be integrated into the foregoing first server, to implement the data storage method provided in the first aspect.

According to a third aspect, this disclosure provides a server, where the server includes a processor, a memory, a communications interface, and a bus. The processor, the memory, and the communications interface are connected to and communicate with each other through the bus. The memory is configured to store a computer-executable instruction. When the server runs, the processor executes the computer-executable instruction in the memory to perform, by using hardware resources in the server, the operation step of the method according to any one of the first aspect or the possible implementations of the first aspect.

According to a fourth aspect, a data storage method is provided, and the method includes: receiving, by a first network interface card, a write instruction sent by a second network interface card, where the first network interface card is a network interface card in a first server, the second network interface card is a network interface card in a second server, the first server includes a non-volatile memory, the non-volatile memory includes a controller and a storage medium, the first network interface card communicates with the second network interface card through a first network, and the write instruction includes target data; storing, by the first network interface card, the target data in a cache of the controller; detecting, by the first network interface card, a read instruction for the target data, where the read instruction is used to instruct the first network interface card to store the target data in the storage medium of the non-volatile memory; and storing, by the first network interface card, the target data in the storage medium of the non-volatile memory according to the read instruction.

After the first network interface card stores the target data in the cache of the controller, the first network interface card detects the read instruction for the target data, and stores the target data in the storage medium of the non-volatile memory according to the read instruction. In other words, when the second server needs to write the target data to the first server, the target data is not only written to the cache of the first server, but also written to the storage medium of the first server. This can ensure that the data in the cache is written to the storage medium promptly. Therefore, a case in which the second server becomes abnormal because the first server is faulty is avoided. In addition, according to the data storage method provided in this disclosure, because the first server provides a data storage service for the second server, only network resources and computing resources may be deployed in the second server, so that performance of the second server is improved.

Optionally, the detecting, by the first network interface card, a read instruction for the target data includes: when the first network interface card determines that all the target data is written to the cache, generating, by the first network interface card, the read instruction for the target data; and detecting, by the controller, the read instruction.

In a possible implementation, when the first network interface card in the first server determines that all the target data is written to the cache, the first network interface card actively triggers the read instruction for the target data, to instruct to flush the target data to the storage medium. In this way, the second server does not need to trigger the read instruction, and overhead of a processor of the second server is reduced.

Optionally, after the storing, by the first network interface card, the target data in the storage medium of the non-volatile memory according to the read instruction, the method further includes: sending, by the first network interface card, a first acknowledgment message for the write instruction to the second network interface card.

For the foregoing possible implementation, because the first network interface card immediately flushes the target data to the storage medium after storing the target data in the cache, the first network interface card needs to send the first acknowledgment message for the write instruction to the second server after flushing the target data to the storage medium. In this way, the second server may determine, based on the first acknowledgment message, that the target data has been flushed to the storage medium, so that the second server learns a storage status of the target data promptly.

Optionally, the detecting, by the first network interface card, a read instruction for the target data includes: when the first network interface card determines that all the target data is written to the cache, sending, by the first network interface card, a second acknowledgment message for the write instruction to the second network interface card, to enable the second network interface card to send the second acknowledgment message to the processor of the second server, to enable the processor of the second server to send the read instruction for the target data to the first network interface card through the second network interface card when receiving the second acknowledgment message; and receiving, by the first network interface card, the read instruction for the target data, to enable the first network interface card to detect the read instruction.

In another possible implementation, when the first network interface card in the first server determines that all the target data is written to the cache, the second server actively triggers the read instruction for the target data, to instruct the first server to flush the target data to the storage medium. In this way, the target data can be flushed to the storage medium promptly without a need to modify a program in the first server.

Optionally, the method further includes: returning, by the first network interface card, the target data to the second network interface card.

For the foregoing possible implementations, because the read instruction is triggered by the second server, the first server further needs to return the target data to the second server after flushing the target data to the storage medium, to respond to the read instruction sent by the second server promptly.

Optionally, before the detecting, by the first network interface card, a read instruction for the target data, the method further includes: setting, by the controller, a storage identifier of the target data in the cache to a first identifier, where the first identifier is used to indicate that the target data has not been written to the storage medium; and after the storing, by the first network interface card, the target data in the storage medium of the non-volatile memory based on the read instruction, the method further includes: updating, by the controller, the storage identifier of the target data in the cache to a second identifier, where the second identifier is used to indicate that the target data has been written to the storage medium.

The read instruction for the target data can be used to trigger the first server to flush the target data to the storage medium. To prevent the first server from flushing corresponding data to the storage medium each time the first server receives a read instruction, the storage identifier is set for the data in the cache, to indicate whether the corresponding data is flushed to the storage medium. This can reduce unnecessary overhead generated by the controller.

Optionally, the read instruction for the target data includes a storage address of the target data in the cache; and the storing, by the first network interface card, the target data in the storage medium of the non-volatile memory based on the read instruction includes: sending, by the first network interface card, the read instruction to the controller, to enable the controller to obtain the target data based on the storage address of the target data in the cache, and store the obtained target data in the storage medium of the non-volatile memory. When writing the target data to the cache, the first server has learned the storage address of the target data. Therefore, when reading the target data, the first server may directly obtain the target data based on the storage address. This avoids that the first server needs to obtain the storage address of the target data again, thereby reducing the overhead of the controller.

According to a fifth aspect, a data storage system is provided, and the data storage system includes a first server and at least one second server, where each second server is connected to the first server through a first network;

the first server provides a data storage service for each second server through the data storage method in the first aspect; and each second server is configured to provide computing resources and network resources for a service application.

According to the data storage system provided in this disclosure, each second server may provide a computing service and the network resources only for the service application, and the data storage service of the second server is provided by the first server. In this way, even if the second server is faulty, the first server can still ensure that data is not lost, to ensure that the second server can run normally after fault rectification. Therefore, data reliability is improved.

After the second server sends a write instruction for target data to the first server, and when the second server receives a second determining message that is sent by the first server and that is for the write instruction, the second server sends a read instruction for the target data to the first server, to enable the first server to store the target data in a storage medium of a non-volatile memory based on the read instruction.

In a possible implementation, when the first server determines that all the target data is written to a cache, the second server actively triggers the read instruction for the target data, to instruct the first server to flush the target data to the storage medium. In this way, the target data can be flushed to the storage medium promptly without a need to modify a program in the first server. This improves flexibility of the data storage method provided in this disclosure.

According to a sixth aspect, a computer-readable storage medium is provided, the computer-readable storage medium stores an instruction, and when the instruction is run on a computer, the computer performs the foregoing data storage method.

According to a seventh aspect, a computer program product including an instruction is provided, and when the computer program product is run on a computer, the computer is enabled to perform the foregoing data storage method.

DESCRIPTION OF EMBODIMENTS

The following further describes the embodiments of this disclosure in detail with reference to the accompanying drawings.

Figure 1:
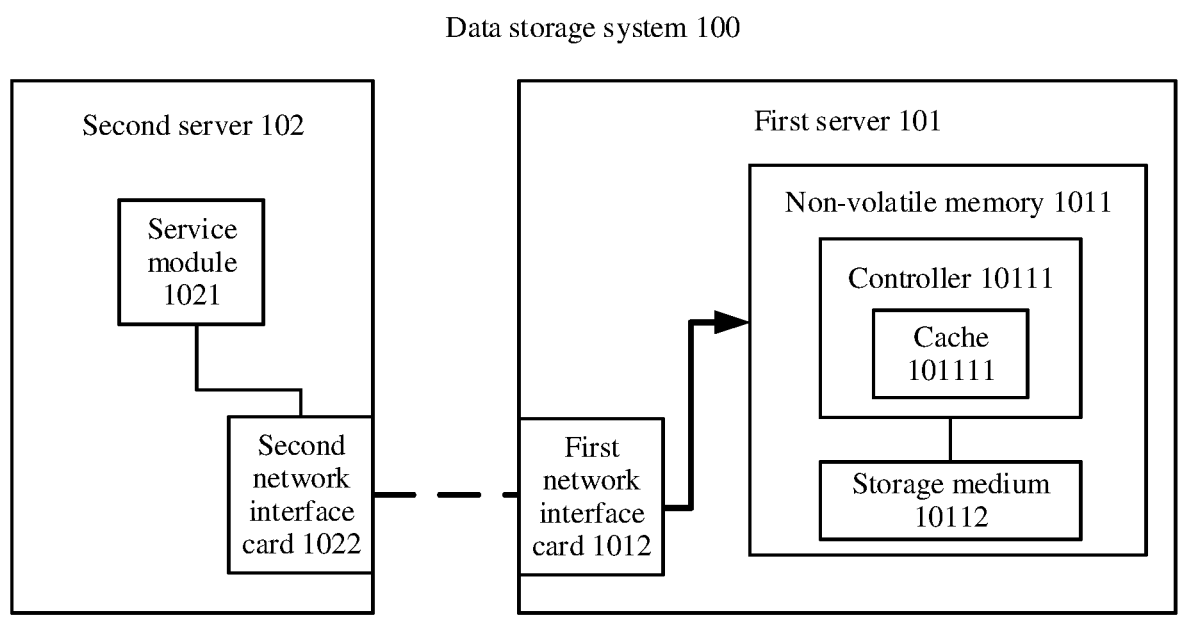
FIG. 1 is an example schematic diagram of a data storage system according to an embodiment of this disclosure.

FIG. 1 is a schematic diagram of a data storage system according to an embodiment of this disclosure. As shown in FIG. 1, the system 100 includes a first server 101 and a second server 102. The first server 101 is connected to the second server 102 through a first network for communication.

As shown in FIG. 1, the first server 101 includes a non-volatile memory (PM) 1011 and a first network interface card (NIC) 1012. The first network interface card 1012 is connected to the non-volatile memory 1011 for communication. The non-volatile memory includes a controller (PM controller) 10111 and a storage medium 10112. The controller 10111 is connected to the storage medium 10112 for communication, and the controller 10111 further includes a cache 101111. The second server 102 includes a service module 1021 and a second network interface card 1022. The service module 1021 is connected to the second network interface card 1022 for communication. The first network interface card 1012 is connected to the second network interface card 1022 through the first network for communication.

When the service module 1021 in the second server initiates a write instruction for a piece of data, the service module 1021 sends the write instruction to the first network interface card 1012 of the first server 101 through the second network interface card 1022. The first network interface card 1012 writes the data to the storage medium 10112 in the non-volatile memory 1011 according to a data storage method provided in the embodiments of this disclosure. An implementation in which the first network interface card 1012 writes the data to the storage medium 10112 in the non-volatile memory 1011 according to the data storage method provided in the embodiments of this disclosure is described in detail in the following embodiment.

In addition, the first network may be an RDMA network. The RDMA network includes a network based on an RDMA protocol and a network based on an RDMA extension protocol. For example, the RDMA network includes a network such as an internet wide-area remote direct memory access protocol (iWARP) network, a remote direct memory access over converged Ethernet (RoCE) network, or an InfiniBand (IB) network. This is not specifically limited in the embodiments of this disclosure. In addition, because the first network may be the RDMA network, the first network interface card and the second network interface card may also be collectively referred to as an RDMA network interface card (RNIC). Names of the first network interface card and the second network interface card are not limited in the embodiments of this disclosure. In addition, the RDMA network is a high-speed transmission network. In the embodiments of this disclosure, the first network may alternatively be another type of high-speed transmission network.

The non-volatile memory in the first server shown in FIG. 1 may be an SCM, or may be another non-volatile memory. The first server deployed with the SCM is configured to provide a data storage function for the second server. The SCM can include an AEP or Optane® product of Intel®.

In addition, the second server may also be referred to as a service server, and the service server is configured to provide computing resources and network resources for a service application. The computing resources include processors, for example, a central processing unit (CPU) and a system-on-a-chip (SoC). The network resources include a network interface card, for example, the RNIC.

Figure 2:
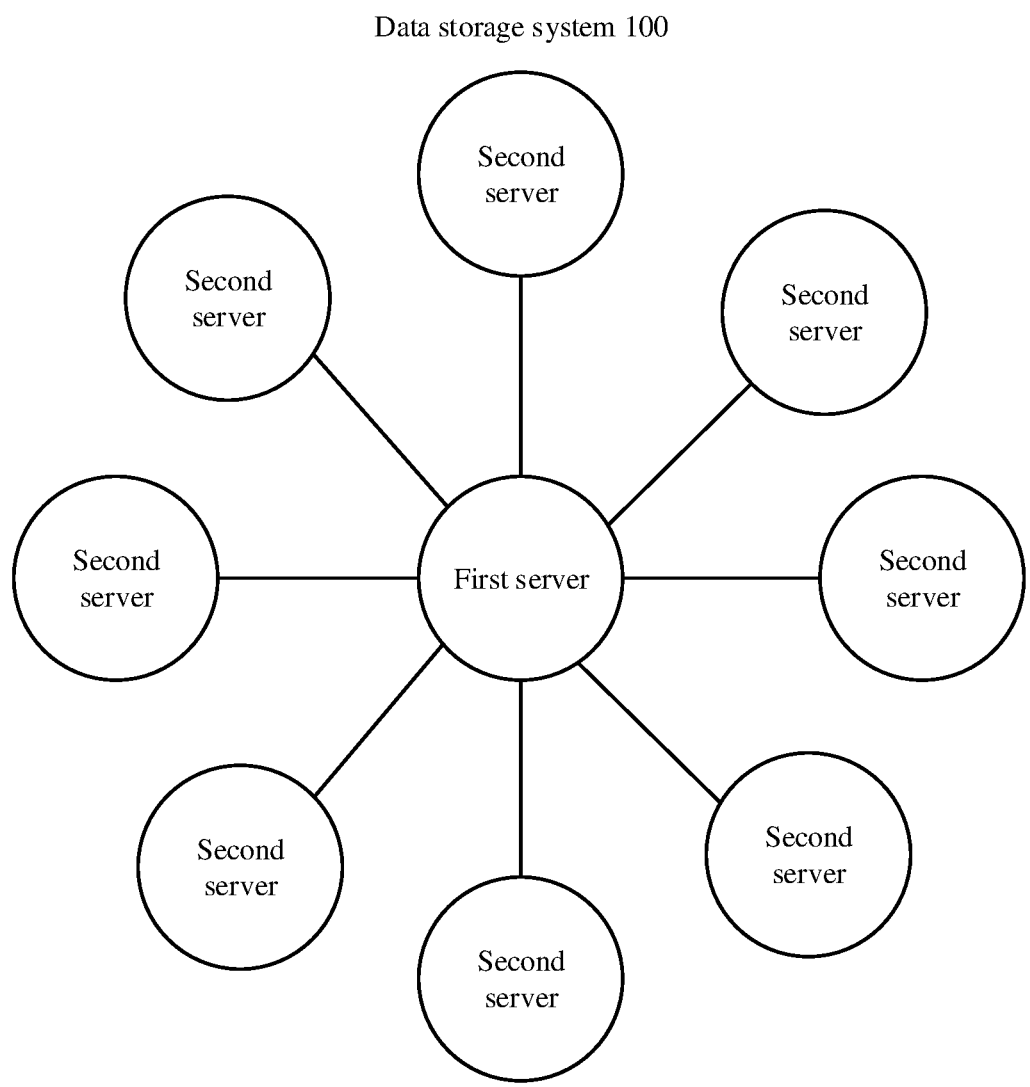
FIG. 2 is an example schematic diagram of another data storage system according to an embodiment of this disclosure.

It should be noted that the system 100 shown in FIG. 1 includes only one second server. Optionally, an embodiment of this disclosure further provides a schematic diagram of a data storage system shown in FIG. 2. As shown in FIG. 2, in this case, the system 100 may include a plurality of second servers, and each second server communicates with the first server through a first network. For a specific connection manner between each second server and the first server, refer to the connection manner shown in FIG. 1.

In a possible embodiment, based on the data storage systems shown in FIG. 1 and FIG. 2, an embodiment of this disclosure further provides another data storage system. The data storage system includes a plurality of first servers and a plurality of second servers. A difference between the data storage system and the data storage system shown in FIG. 2 is that, in the data storage system, some second servers communicate with at least one first server through a first network, and the other second servers communicate with other first servers through the first network. In other words, the second servers in the data storage system are divided into two or more sets, and the second server sets can use a different first server to store data.

Figure 3:
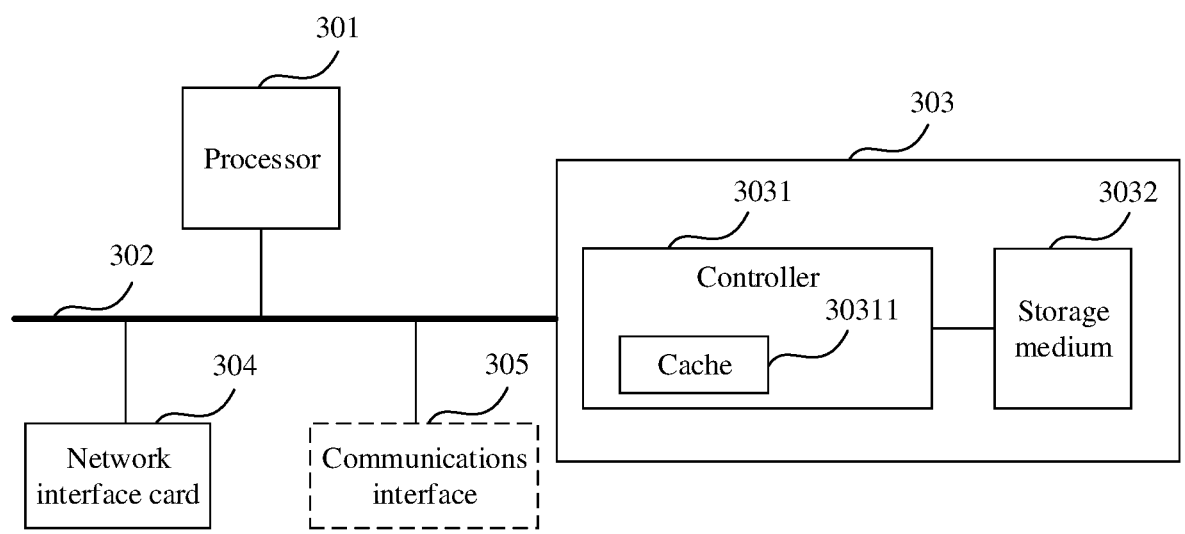
FIG. 3 is an example schematic structural diagram of a server according to an embodiment of this disclosure.

FIG. 3 is a schematic structural diagram of a server according to an embodiment of this disclosure. The first server in FIG. 1 or FIG. 2 may be implemented through the server shown in FIG. 3. Referring to FIG. 3, the server includes at least one processor 301, a bus 302, a non-volatile memory 303, and a network interface card 304. The network interface card 304 is the first network interface card 1012 in the system shown in FIG. 1.

The processor 301 may be a general-purpose central processing unit (CPU), a microprocessor, an application-specific integrated circuit (ASIC), or one or more integrated circuits configured to control program execution in the solutions of this disclosure. Each processor may be a single-core (e.g., single-CPU) processor, or may be a multi-core (e.g., multi-CPU) processor. The processor herein may be one or more devices, circuits, and/or processing cores configured to process data (for example, a computer program instruction).

The bus 302 may include a path for transmitting information between the processor 301, the non-volatile memory 303, and the network interface card 304. The bus 302 may further include a power bus, a control bus, a status signal bus, and the like, in addition to a data bus. However, for clear description, various types of buses in the figure are marked as the bus 302.

As shown in FIG. 3, the non-volatile memory 303 includes a controller 3031 and a storage medium 3032. The controller 3031 is configured to manage data stored in the storage medium 3032. The controller 3031 is connected to the storage medium 3032 through an internal bus. The internal bus may be a bus based on a storage protocol. For example, the storage protocol may be a data transmission protocol such as RS-232 (a data transmission protocol formulated by the Electronic Industry Association). This is not specifically limited herein.

In addition, as shown in FIG. 3, the controller 3031 further includes a cache 30311. When the controller 3031 receives to-be-stored data, the controller 3031 first stores the data in the cache 30311, and then stores the data from the cache 30311 to the storage medium 3032 based on a related instruction. An implementation in which that the controller 3031 stores the data from the cache 30311 to the storage medium 3032 based on the related instruction is described in detail in the following embodiment.

In addition, the storage medium 3032 is a non-volatile storage medium, configured to store massive data. For example, the storage medium 30311 includes mediums such as a phase change memory, a ferroelectric memory, and a magnetic memory. This is not specifically limited in this embodiment of this disclosure. Currently, the phase change memory includes products such as a 3D XPOINT® (a product of Intel®), and the ferroelectric memory includes products such as a ferroelectric random access memory and a ferroelectric crystal.

When the non-volatile memory is an SCM, the SCM may be embedded in a slot of a first server like a dynamic random access memory. Compared with the dynamic random access memory, the SCM can still continuously store data in a power-off state, and has a power-off storage feature. The SCM can provide faster read and write speeds than a flash memory, and is cheaper than the dynamic random access memory in terms of costs. Therefore, in system architectures of some computing devices, the SCM may be used as a memory. In addition, a plurality of computing devices in which the SCM is used as the memory may be connected in an interconnection manner to form an SCM resource pool, to expand a capacity of the SCM. Therefore, data redundancy backup is implemented.

The network interface card 304 is configured to communicate with the second server. In other words, in this embodiment of this disclosure, the first server is connected to the second server through the network interface card 304, to implement the data storage method provided in the embodiments of this disclosure.

In addition, as shown in FIG. 3, the server may further include a communications interface 305, configured to communicate with another device or a communications network, for example, an Ethernet, a radio access network (RAN), a wireless local area network (WLAN), and the like.

The foregoing server may be a general-purpose server or a special-purpose server. In a specific implementation, the server may be a device such as various storage servers. A type of the server is not limited in the embodiments of this disclosure.

The following describes the data storage method provided in the embodiments of this disclosure in detail.

Figure 4:
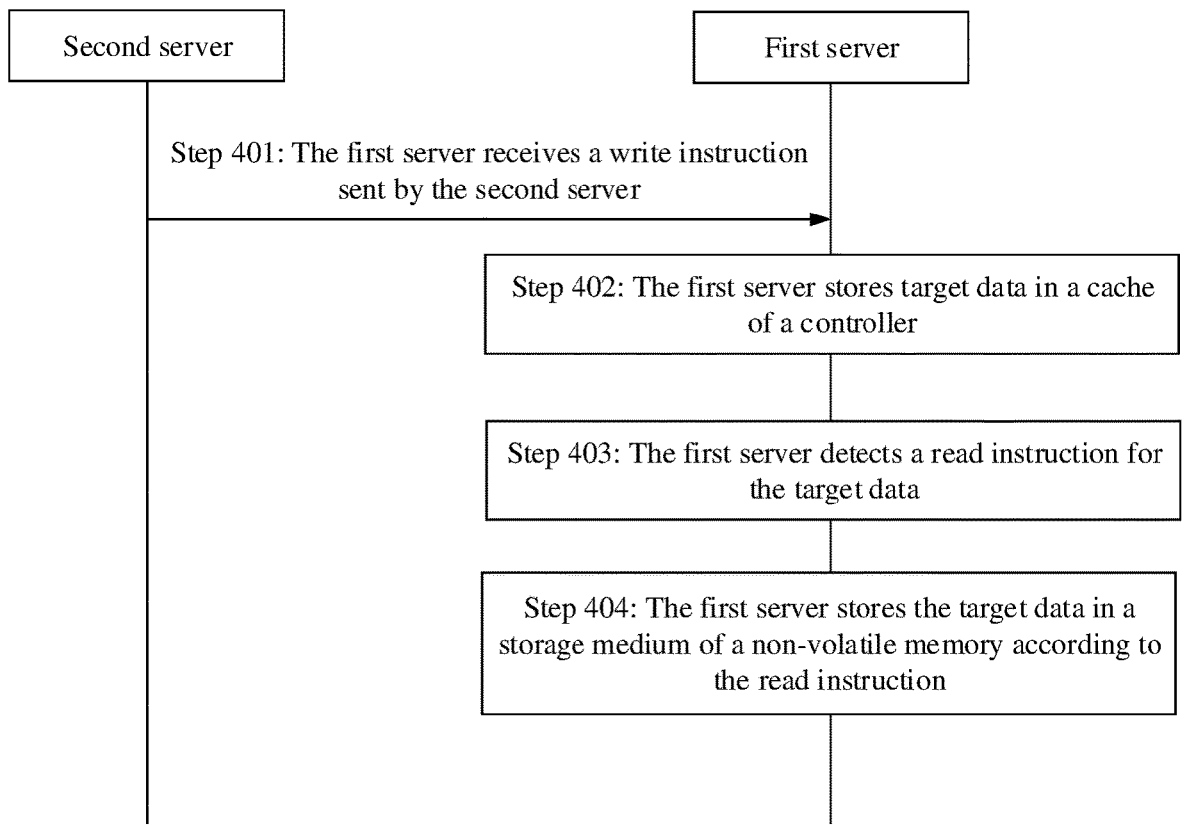
FIG. 4 is an example flowchart of a data storage method according to an embodiment of this disclosure.

FIG. 4 is a flowchart of a data storage method according to an embodiment of this disclosure. As shown in FIG. 4, the method includes at least the following steps.

Step 401: A first server receives a write instruction sent by a second server, where the first server includes a non-volatile memory, the non-volatile memory includes a controller and a storage medium, the first server communicates with the second server through a first network, and the write instruction includes target data.

In this embodiment of this disclosure, step 401 may be implemented in either of the following two manners.

Manner 1: The second server first obtains, from the first server, an identifier of an address used to store the target data, and then sends the write instruction to the first server based on the obtained identifier of the address.

Specifically, when a service module in the second server generates a piece of data in a service processing process, the service module needs to store the data. For ease of subsequent description, the data that needs to be stored is referred to as the target data. An implementation in which the service module stores the target data may be as follows. The service module determines a size of the target data, and sends an address obtaining request to a first network interface card through a second network interface card, where the address obtaining request carries the size of the target data. When the first network interface card receives the address obtaining request, the first network interface card sends the address obtaining request to a processor of the first server. The processor allocates an address to the target data based on the size of the target data and an available address in a cache, to obtain a first address, and the processor returns address obtaining request response information to the second network interface card through the first network interface card. The address obtaining request response information carries an identifier of the first address. When receiving the address obtaining request response information, the second network interface card sends the address obtaining request response information to the service module. The service module determines a storage location of the target data in the first server based on the received address obtaining request response information, and then sends the write instruction to the first network interface card through the second network interface card. The write instruction carries the identifier of the first address and the target data.

In other words, in the manner 1, when the second server needs to store the target data to the first server, the second server needs to first obtain, based on the processor of the first server, the first address used to store the target data, to ensure that the first data can be successfully stored in the first server.

Manner 2: The second server directly sends the write instruction including the target data to the first server, to enable the first server to determine, after receiving the write instruction, an identifier of an address used to store the target data.

Specifically, when a service module in the second server needs to store the target data in the first server, the service module directly sends the write instruction for the target data to the first network interface card through the second network interface card, where the write instruction carries the target data. When receiving the write instruction, the first network interface card may write the target data to a cache through the following step 402.

In other words, in the manner 2, when the second server needs to store the target data to the first server, the second server does not first obtain a first address used to store the target data, but directly sends the target data to the first server, so that the first server allocates a storage address to the target data in a process of storing the target data. This improves storage efficiency of the target data.

The foregoing two manners are merely two possible implementations of step 401, and do not constitute a limitation on this embodiment of this disclosure. In on example embodiment, the first server may receive, in another manner, the write instruction sent by the second server.

The first address is a storage address allocated by the processor of the first server to the target data, and the storage address is a storage address of the target data in the cache. In addition, it can be learned from FIG. 1 that the first network interface card may communicate with the second network interface card through an RDMA protocol-based network connection. Correspondingly, the write instruction may be an RDMA network-based write instruction (e.g., RDMA write). Certainly, if the first network interface card is connected to the second network interface card through another network, correspondingly, the write instruction is also a write instruction in another network format. This is not specifically limited in the embodiments of this disclosure.

Step 402: The first server stores the target data in a cache of the controller.

For the manner 1 in step 401, because in this case, the write instruction already carries the identifier of the first address used to store the target data, the first server may directly store the target data in the cache of the controller based on the identifier of the first address. Specifically, when receiving the write instruction, the first network interface card obtains the target data and the identifier of the first address that are carried in the write instruction, and writes the target data to the cache of the controller based on the identifier of the first address through the controller.

For the manner 2 in step 401, because in this case, the write instruction carries only the target data, the first server first needs to determine the storage address used to store the target data, and then stores the target data in the cache of the controller based on the determined storage address. Specifically, when receiving the write instruction, the first network interface card obtains the target data carried in the write instruction, determines a size of the target data, and sends an address obtaining request to the processor, where the address obtaining request carries the size of the target data. When the processor receives the address obtaining request, the processor allocates the address to the target data based on the size of the target data and an available address in the cache, to obtain the first address, and returns an identifier of the first address to the first network interface card. When receiving the identifier of the first address, the first network interface card writes the target data to the cache based on the identifier of the first address through the controller.

In the foregoing two implementations, an implementation in which the first network interface card writes the target data to the cache through the controller based on the identifier of the first address may be as follows. The first network interface card divides the target data by byte to obtain a plurality of pieces of metadata, and sequentially sends each piece of metadata to the controller based on the identifier of the first address. The controller stores each piece of received metadata in the cache based on the identifier of the first address.

Similarly, the foregoing two implementations are merely two possible implementations of step 402, and do not constitute a limitation on this embodiment of this disclosure. In an actual application, the first server may further store the target data in the cache of the controller in another manner.

When the first server stores the target data in the cache of the controller, the target data needs to be stored from the cache to the storage medium of the non-volatile memory promptly, to avoid a loss of the target data caused by a power failure of the first server at this time point. In other words, the target data needs to be flushed from the cache to the storage medium promptly. Specifically, the target data may be flushed from the cache to the storage medium promptly through the following step 403 to step 404. The storage medium mentioned in the embodiments of this disclosure is the storage medium in FIG. 1 or FIG. 3. In other words, the storage medium in the embodiments of this disclosure is the storage medium in the non-volatile memory deployed in the first server.

Step 403: The first server detects a read instruction for the target data, where the read instruction is used to instruct the first server to store the target data in the storage medium of the non-volatile memory.

After storing the target data in the cache of the controller, the first server may trigger the read instruction for the target data, so that the target data is stored from the cache to the storage medium of the non-volatile memory promptly. The read instruction may be triggered by the first server, or may be triggered by the second server. Therefore, step 403 has at least the following two possible implementations.

Manner 1 is applied to a scenario in which the read instruction is triggered by the first server.

In this case, step 403 may be specifically as follows. When the first server determines that the target data is written to the cache, the first network interface card included in the first server generates the read instruction for the target data, to enable the first server to detect the read instruction.

It can be learned from step 402 that, that the first server stores the target data in a cache of the controller is essentially that the first network interface card sequentially writes the target data to the cache of the controller by byte through the controller. Therefore, when the first network interface card writes all bytes of the target data to the cache, it may be determined that the target data is written to the cache. In this case, the first network interface card actively generates the read instruction, and the controller detects the read instruction.

The read instruction carries the storage address of the target data in the cache, so that the target data is subsequently read based on the storage address of the target data in the cache. It should be noted that, before the first network interface card writes the target data to the cache, the first network interface card has learned the storage address of the target data. Therefore, in the manner 1, the first network interface card may directly generate the read instruction based on the storage address of the target data in the cache.

In the scenario described in the manner 1 in step 403, a program in the second server is appropriately modified, so that after the second server triggers the write instruction for the target data, the first server may directly write the target data to both the cache and the storage medium through step 403 and the following step 404. In this way, the target data is flushed to the storage medium promptly. In this manner of storing the target data in the storage medium, resource overheads can be reduced, and network communication is simplified.

Manner 2 is applied to a scenario in which the read instruction is triggered by the second server.

When the first server determines that the target data is written to the cache, the first server sends a second acknowledgment message for the write instruction to the second server, to enable the second server to send the read instruction for the target data to the first server when receiving the second acknowledgment message. The first server receives the read instruction for the target data, to enable the first server to detect the read instruction.

Similarly, it can be learned from step 402 that when the first network interface card writes all bytes of the target data to the cache, it may be determined that the target data is written to the cache. In this case, the first network interface card sends the second acknowledgment message for the write instruction to the service module through the second network interface card. When receiving the second acknowledgment message, the service module may generate the read instruction for the target data, and send the read instruction to the first network interface card through the second network interface card. When the first network interface card receives the read instruction, it is equivalent to the first server detecting the read instruction for the target data.

It can be learned from FIG. 1 that the first network interface card may communicate with the second network interface card through an RDMA network connection. Therefore, in the manner 2 in step 403, the write instruction may be an RDMA network-based read instruction (e.g., RDMA read). In other words, the RDMA read is a read instruction transmitted over an RDMA network. Certainly, if the first network interface card is connected to the second network interface card through another network, correspondingly, the read instruction is also a read instruction in another network format. This is not specifically limited in the embodiments of this disclosure.

In the scenario described in the manner 2 in step 403, after the second server triggers the write instruction for the target data, the first server first stores the target data in the cache, and the second server triggers the read instruction, so that the target data is flushed to the storage medium promptly through the following step 404. In this manner of flushing the target data to the storage medium, a program of the first server does not need to be modified. The target data can be stored in the storage medium promptly through a conventional read after write (RAW) manner. The conventional RAW manner is a manner in which after sending a write instruction for a piece of data, the second server immediately sends a read instruction for the same data if receiving a second acknowledgment message for the write instruction. However, a disadvantage of the manner 2 is that both the read instruction and the write instruction are triggered by the service module of the second server, and this increases CPU overhead of the second server.

In addition, the read instruction carries the storage address of the target data in the cache, so that the first server subsequently reads the target data based on the storage address of the target data in the cache. It can be learned from step 401 that, before sending the write instruction, the second server may have learned the storage address of the target data in the cache of the first server, or may not have learned the storage address of the target data in the cache of the first server. Therefore, in the manner 2 in step 403, the service module may generate the read instruction for the target data in at least the following two implementations.

(1) For the manner 1 in step 401, because in this case, the second server has learned the storage address of the target data in the cache before sending the write instruction, the service module may directly generate the read instruction based on the storage address of the target data in the cache.

(2) For manner 2 in step 401, because in this case, before sending the write instruction, the second server does not learn the storage address of the target data in the cache, the service module further needs to send the address obtaining request to the first network interface card through the second network interface card when receiving the second acknowledgment message, where the address obtaining request carries the identifier of the target data; when receiving the address obtaining request, the first network interface card determines the storage address of the target data in the cache based on the identifier of the target data, and sends the obtained storage address to the second network interface card through the first network interface card; and when receiving the storage address, the second network interface card sends the storage address to the service module, to enable the service module to generate the read instruction based on the storage address.

Step 404: The first server stores the target data in the storage medium of the non-volatile memory based on the read instruction.

It can be learned from step 403 that, regardless of whether the read instruction is triggered by the first server or the second server, the read instruction carries the storage address of the target data. Therefore, in a possible implementation, step 404 may be specifically as follows. The first server obtains the target data based on the storage address of the target data in the cache, and stores the obtained target data in the storage medium of the non-volatile memory.

An implementation in which the first server obtains the target data based on the storage address of the target data in the cache may be as follows. The first network interface card sends the read instruction to the controller, where the read instruction carries the storage address of the target data in the cache. When receiving the storage address of the target data in the cache, the controller reads the target data based on the storage address of the target data in the cache, and returns the target data to the first network interface card.

In this embodiment of this disclosure, in the process in which the first server reads the target data based on the read instruction, the first server may store the target data to the storage medium at the same time, so that the target data is flushed from the cache of the controller to the storage medium promptly based on the read instruction. Therefore, in a possible implementation, that the first server stores the obtained target data in the storage medium of the non-volatile memory may be specifically as follows. In a process in which the controller is reading the target data, the controller stores the target data from the cache to the storage medium at the same time.

In addition, in this embodiment of this disclosure, the read instruction is used to trigger the storage of the target data from the cache to the storage medium. Therefore, to prevent the first server from storing, from the cache to the storage medium each time the first server receives a read instruction, data corresponding to the data read instruction, a storage identifier may be set for each piece of data in the cache. The storage identifier includes a first identifier and a second identifier. The first identifier is used to indicate data that is not written to the storage medium, and the second identifier is used to indicate data that is written to the storage medium. Therefore, in step 402, after the first server stores the target data in the cache of the controller, the first server sets a storage identifier of the target data in the cache to the first identifier. Correspondingly, in step 404, after the first server stores the target data in the storage medium of the non-volatile memory, the first server further updates the storage identifier of the target data in the cache to the second identifier.

Based on the foregoing setting of the storage identifier, when the first server receives a read instruction for a piece of data, the first server first determines a storage identifier of the data. If the storage identifier of the data is the first identifier, and when the first server obtains the data, the first server flushes the data to the storage medium and updates the storage identifier of the data. If the storage identifier of the data is the second identifier, only the data needs to be obtained.

In foregoing step 401 to step 404, each time the first server detects a read instruction for a piece of data, the first server determines whether the data is stored from the cache to the storage medium. If the data is not stored from the cache to the storage medium, the first server immediately stores the data from the cache to the storage medium. In this way, data in the cache can be stored in the storage medium promptly. In this way, because the data in the cache is stored in the storage medium promptly, a case in which data in the second server is lost can be avoided even if the first server encounters a fault such as the power failure. Therefore, a case in which the second server becomes abnormal because the first server is faulty is avoided.

In addition, in a process in which the first server stores the data according to step 401 to step 404, because each piece of data in the cache has the corresponding storage identifier, and the storage identifier is used to indicate whether the corresponding data has been stored from the cache to the storage medium, the first server may further detect the storage identifier of each piece of data periodically or in real time, and store data whose storage identifier is the first identifier from the cache to the storage medium promptly. This further improves security and reliability of data storage.

In addition, for the manner 1 in step 403, the read instruction is triggered by the first server. In this case, after the first server writes the target data to the cache, the first server directly generates the read instruction, to store the target data in the storage medium through step 404. Therefore, after the first server stores the target data in the storage medium of the non-volatile memory based on the read instruction, the first server further needs to send a first acknowledgment message for the write instruction to the second server, to enable the second server to determine that the target data is written to the first server. An implementation in which the first server sends the first acknowledgment message for the write instruction to the second server may be as follows. The first network interface card sends the first acknowledgment message to the service module through the second network interface card, and when receiving the first acknowledgment message, the service module determines that the target data is written to both the cache and the storage medium.

For the manner 2 in step 403, the read instruction is triggered by the second server. In this case, after the first server writes the target data to the cache, the second server generates the read instruction, to store the target data to the storage medium through step 404. Therefore, after the first server stores the target data in the storage medium of the non-volatile memory based on the read instruction, the first server returns the target data to the second server, to respond to the read instruction sent by the second server.

In this embodiment of this disclosure, after the first server stores the target data in the cache of the controller, the first server detects the read instruction for the target data, and stores the target data in the storage medium of the non-volatile memory based on the read instruction. In other words, in this disclosure, when the second server needs to write the target data to the first server, the target data is not only written to the cache of the first server, but also written to the storage medium of the first server. This can ensure that the data in the cache is written to the storage medium promptly. Therefore, the case in which the second server becomes abnormal because the first server is faulty is avoided. In addition, because the first server provides a data storage service for the second server, only network resources and computing resources may be deployed in the second server, and a processor of the second server does not need to pay attention to a process in which data is stored from a cache to a memory, and to a network interface card. Therefore, the computing resources of the second server are saved, and performance of the second server is improved. In addition, because the RDMA network is a high-speed network, when processing data, the processor of the second server may directly store the data in the first server. This reduces overhead of the processor of the second server, and improves the overall performance of the second server. In addition, if the read instruction is triggered by the first server, the second server does not need to trigger the read instruction. In this way, the overhead of the processor of the second server can be reduced, and a plurality of interactions between the first server and the second server can be avoided, to optimize network communication between the first server and the second server.

Figure 5:
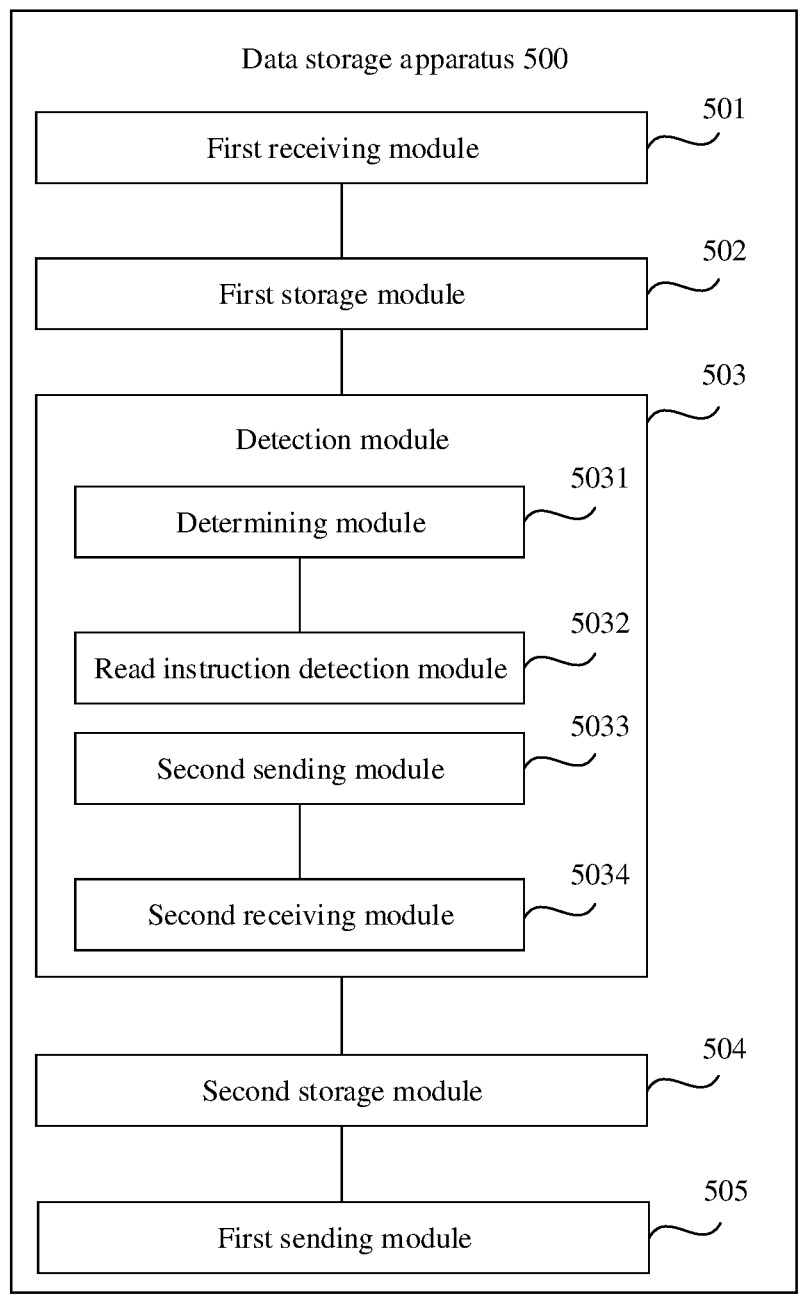
FIG. 5 is an example block diagram of a data storage apparatus according to an embodiment of this disclosure.

FIG. 5 shows a data storage apparatus according to an embodiment of this disclosure. As shown in FIG. 5, the apparatus 500 includes:

a first receiving module 501, configured to receive a write instruction sent by a second server, where the write instruction includes target data;

a first storage module 502, configured to store the target data in a cache of a controller, where a first server includes a non-volatile memory, the non-volatile memory includes the controller and a storage medium, and the first server communicates with the second server through a first network;

a detection module 503, configured to detect a read instruction for the target data, where the read instruction is used to instruct to store the target data in the storage medium of the non-volatile memory; and a second storage module 504, configured to store the target data in the storage medium of the non-volatile memory based on the read instruction.

Optionally, the detection module 503 includes a determining module 5031 and a read instruction detection module 5032.

The determining module 5031 is configured to: when it is determined that the target data is written to the cache, generate the read instruction for the target data; and the read instruction detection module 5032 is configured to detect the read instruction.

Optionally, the apparatus 500 further includes a first sending module 505.

The first sending module 505 is configured to send a first acknowledgment message for the write instruction to the second server.

Optionally, the detection module 503 further includes a second sending module 5033 and a second receiving module 5034.

The second sending module 5033 is configured to: when it is determined that the target data is written to the cache, send a second acknowledgment message for the write instruction to the second server; and the second receiving module 5034 is configured to receive the read instruction for the target data.

Optionally, the second storage module 504 is further configured to: obtain the target data based on a storage address of the target data in the cache, and store the obtained target data in the storage medium of the non-volatile memory.

Optionally, the first network includes an RDMA network, and the non-volatile memory is an SCM.

It should be noted that, when the data storage apparatus provided in the foregoing embodiment performs data storage, only divisions of the foregoing functional modules are used as an example for description. In an actual application, the foregoing functions may be allocated to and completed by different functional modules based on a requirement, in other words, an internal structure of a device is divided into different functional modules, to complete all or some of the functions described above. In addition, the data storage apparatus provided in the foregoing embodiment and the data storage method embodiments pertain to a same concept. For a specific implementation process of the data storage apparatus, refer to the method embodiments.

It should be understood that the data storage apparatus provided in this embodiment of this disclosure may be implemented through an application-specific integrated circuit (ASIC) or a programmable logic device (PLD). The PLD may be a complex programmable logical device (CPLD), a field programmable gate array (FPGA), a generic array logic (GAL), or any combination thereof. In addition, the data storage method shown in FIG. 4 may also be implemented through software. In this case, the data storage apparatus and modules of the data storage apparatus may also be software modules.

In addition, the data storage apparatus 500 provided in this embodiment of this disclosure may correspondingly perform the data storage method described in the embodiments of this disclosure. In addition, the foregoing and other operations and/or functions of the units in the provided data storage apparatus 500 are separately used to implement corresponding procedures of the data storage method shown in FIG. 4. In other words, the foregoing modules may be integrated into the first server shown in FIG. 1 or FIG. 2, to implement the data storage method provided in the foregoing embodiments.

All or some of the foregoing embodiments may be implemented through software, hardware, firmware, or any combination thereof. When the software is used to implement the embodiments, all or some of the embodiments may be implemented in a form of a computer program product. The computer program product includes one or more computer instructions. When the computer instructions are loaded and executed on the computer, the procedures or functions according to the embodiments of this disclosure are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by a computer, or a data storage device such as a server or a data center that integrates one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, a compact disc, or the like.

The foregoing descriptions are merely embodiments of this disclosure, but are not intended to limit this disclosure. Any modification, equivalent replacement, or improvement made without departing from the spirit and principle of this disclosure should fall within the protection scope of this disclosure.

What is claimed is:

1. A data storage method implemented via, at least, a first server having a non-volatile memory, the non-volatile memory including a controller and a storage medium, the data storage method comprising:
    receiving, by the first server, a write instruction sent by a second server, wherein the first server communicates with the second server through a first network, and the write instruction comprises target data;
    storing, by the first server, the target data in a cache of the controller;
    detecting, by the first server, a read instruction for the target data, wherein the read instruction is used to instruct the first server to store the target data in the storage medium of the non-volatile memory; and
    storing, by the first server, the target data in the storage medium of the non-volatile memory based on the read instruction.

2. The method of claim 1, wherein the first server further comprises a first network interface card, and detecting the read instruction for the target data comprises:
    when the first network interface card determines that the target data is written to the cache, generating, by the first network interface card, the read instruction for the target data; and
    detecting, by the controller, the read instruction.

3. The method of claim 2, wherein after storing the target data in the storage medium, the method further comprises:
    sending, by the first server, a first acknowledgment message for the write instruction to the second server.

4. The method of claim 1, wherein detecting the read instruction for the target data comprises:
    when the first server determines that the target data is written to the cache, sending, by the first server, a second acknowledgment message for the write instruction to the second server, to enable the second server to send the read instruction for the target data to the first server when receiving the second acknowledgment message; and
    receiving, by the first server, the read instruction for the target data, to enable the first server to detect the read instruction.

5. The method of claim 1, wherein the read instruction for the target data comprises a storage address of the target data in the cache; and
    storing the target data in the storage medium comprises:
        obtaining, by the first server, the target data based on the storage address of the target data in the cache, and
        storing the obtained target data in the storage medium of the non-volatile memory.

6. The method of claim 1, wherein the first network comprises a remote direct memory access (RDMA) network, and the non-volatile memory is a storage class memory (SCM).

7. A server system, comprising:
    a first server having at least a processor and a non-volatile memory, the non-volatile memory comprising a controller and a storage medium; and
    a second server configured to communicate with the first server through a first network,
    wherein the first server is configured to:
        receive a write instruction sent by the second server, wherein the write instruction comprises target data;
        store the target data in a cache of the controller;
        detect a read instruction for the target data, wherein the read instruction is used to instruct the first server to store the target data in the storage medium of the non-volatile memory; and
        store the target data in the storage medium of the non-volatile memory based on the read instruction.

8. The server system of claim 7, wherein the first server further comprises a first network interface card, and the first server is further configured to:
    generate, when the first network interface card determines that the target data is written to the cache, the read instruction for the target data; and
    detect, by the controller, the read instruction.

9. The server system of claim 8, wherein the first server is further configured to:
    send, after the storing, by the first server, the target data in the storage medium of the non-volatile memory based on the read instruction, a first acknowledgment message for the write instruction to the second server.

10. The server system of claim 7, wherein the first server is further configured to:
    send, when the first server determines that the target data is written to the cache, a second acknowledgment message for the write instruction to the second server, to enable the second server to send the read instruction for the target data to the first server when receiving the second acknowledgment message; and receive the read instruction for the target data, to enable the first server to detect the read instruction.

11. The server system of claim 7, wherein the read instruction for the target data comprises a storage address of the target data in the cache, and the first server is further configured to:

obtain the target data based on the storage address of the target data in the cache; and store the obtained target data in the storage medium of the non-volatile memory.

12. The server system of claim 7, wherein the first network comprises a remote direct memory access (RDMA) network, and the non-volatile memory includes a storage class memory (SCM).

13. A non-transitory computer-readable storage medium storing instructions which, when executed by a computer, cause the computer to provide execution comprising:

receiving, by a first server having a non-volatile memory that includes a controller and a storage medium, a write instruction sent by a second server, wherein the first server communicates with the second server through a first network, and the write instruction comprises target data;

storing the target data in a cache of the controller;

detecting a read instruction for the target data, wherein the read instruction is used to instruct the first server to store the target data in the storage medium of the non-volatile memory; and storing the target data in the storage medium of the non-volatile memory based on the read instruction.

14. The non-transitory computer-readable storage medium of claim 13, wherein the computer is further caused to provide execution comprising:

generating, when the first network interface card determines that the target data is written to the cache, the read instruction for the target data; and detecting the read instruction.

15. The non-transitory computer-readable storage medium of claim 14, wherein the computer is further caused to provide execution comprising:

sending, after storing the target data in the storage medium of the non-volatile memory based on the read instruction, a first acknowledgment message for the write instruction to the second server.

16. The non-transitory computer-readable storage medium of claim 13, wherein the computer is further caused to provide execution comprising:

sending, when the first server determines that the target data is written to the cache, a second acknowledgment message for the write instruction to the second server, to enable the second server to send the read instruction for the target data to the first server when receiving the second acknowledgment message; and receiving the read instruction for the target data, to enable the first server to detect the read instruction.

17. The non-transitory computer-readable storage medium of claim 13, wherein the computer is further caused to provide execution comprising:

obtaining the target data based on the storage address of the target data in the cache; and storing the obtained target data in the storage medium of the non-volatile memory, wherein the read instruction for the target data comprises a storage address of the target data in the cache.

18. The non-transitory computer-readable storage medium of claim 13, wherein the first network comprises a remote direct memory access (RDMA) network, and the non-volatile memory includes a storage class memory (SCM).

* * * * *